Patented July 9, 1929.

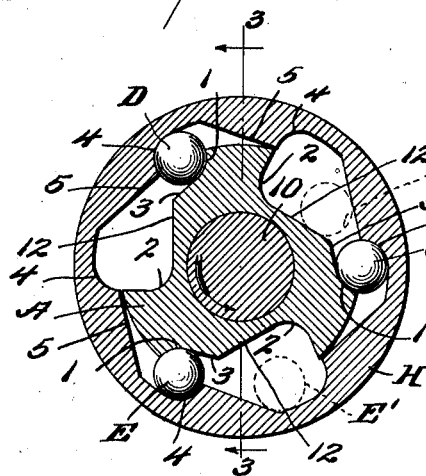

1,719,881

UNITED STATES PATENT OFFICE.

FRANK T. FARMER, OF DETROIT, MICHIGAN, ASSIGNOR OF ONE-HALF TO ROBERT E. FARMER, OF NEW YORK, N. Y.

CLUTCH.

Application filed May 5, 1925. Serial No. 28,142.

My invention relates to a ball clutch and altho its principles can be adapted to, and used on other mechanical devices, my design is intended for and particularly adapted to be used on lawn mowers.

Among the objects of my invention are:

1. To provide a pinion, in combination with a ball clutch driving mechanism, which will have a bearing on the reel shaft, the entire length of the combined pinion and the male driving clutch member, thus providing an adequate wearing surface for the pinion and clutch on the reel shaft.

2. To eliminate as far as possible, the twisting strain thrown by the pinion against the shaft when the clutch is engaged, by providing a bearing for the male driving clutch member on the shaft, directly under the line of thrust when the balls are engaged. The twisting strain referred to has reference to the cross thrust the pinion has against the shaft when the clutch is engaged, and the drive wheel pulling on the teeth of the pinion. With the usual form of clutch used on lawn mowers, the drive clutch is combined with the pinion but over-hangs the shaft and has no bearing on the shaft, the clutch engaging a pin working in the shaft and the pinion having a bearing on the shaft equal only to the length of the gear teeth. The thrust of the clutch pulling against the power of the drive wheel makes the pinion take a bearing on the shaft at opposite ends of the pinion bore and consequently the bore of the pinion soon wears elliptical at the ends of the pinion and the shaft wears away at the points of the pinion contact, destroying in a large degree the efficiency of the gripping properties of the clutch.

3. To provide a clutch wherein, when the driving balls are engaged in driving the load, the balls will be securely locked in the driving position.

4. To provide a clutch having a multiplicity of balls and ball engaging shoulders or clutches, wherein all the balls can engage in driving at once and thus divide up the strain on the clutch.

5. To provide a clutch wherein, when all the balls are engaged in driving, the stress of the load on the female clutch member is equally divided on the circumference and supported by the bore of the male clutch member, so that the stress on the key in the shaft and on the bore of the female clutch member is directly in line with the direction of rotation, and there is no twisting strain on the bore of the female clutch member, as there would be if only one ball or pawl was used.

6. To provide a clutch wherein the use of lubricating oil is not necessary for the proper functioning of the balls, and in which the balls would work best without any oil.

It will be understood that the principles of my invention may be embodied in various forms and that the details are not material. The form illustrated in the drawing and hereinafter described in detail has been found to be one of the practical embodiments and capable of efficient operation and practical in construction.

In order that my invention may be fully understood, reference is to be had to the accompanying drawings, in which similar reference characters indicate corresponding parts in all the views.

Fig. 1 is a transverse section on the line 1—1 of Fig. 3, showing the clutch in driving position.

Fig. 2 is a similar section showing the clutch in reverse or idling position.

Fig. 3 is a section on the line 3—3 of Fig. 1; and

Fig. 4 is a section on the line 4—4 of Fig. 3.

Referring more particularly to the drawing, A is the driving clutch member and B is the pinion, which are made in one piece and are bored to fit the reel shaft 10, whereby there is provided a long bearing therefor on the reel shaft, which is desirable so as to reduce the wear on the shaft to a minimum. The clutch member A is provided with three drive pockets 1, three reverse pockets 2, for the balls C, D and E to ride in when the clutch is idling, and three locking shoulders 3 that lock the said balls and hold them in driving position, when the clutch is engaged. The drive pockets 1, the reverse pockets 2 and the locking shoulders 3 are all spaced equally distant, respectively. From the inner edge of the pocket 2 extending to the shoulder 3, is a straight surface 12, the function of which is to cause the balls to move outwardly and engage the drive pockets 4 of the female clutch member H.

When the device is assembled, the male clutch member A fits into the chamber of the female clutch member H. A key 9 is driven through a hole in the shaft 10, and the pocket 11 of the female clutch member is slipped over the key 9, securing the female clutch member rigid with the shaft 10. The combined clutch member and pinion A, B fits on the shaft next to the chambered side of clutch member H, the part A fitting into the chamber of H and the part B fitting up against the edge of H, whereby the balls are entirely enclosed in the housing thus formed.

In Fig. 1 of the drawing, the male clutch member A is in driving position with the female clutch member H, the balls C, D and E being in driving engagement with the drive pockets 1 of the male clutch member A. The clutch member A is shown therein as rotating in the direction of the arrow. The balls C' and E' are shown in Fig. 1 of the drawing to illustrate various working positions of the balls.

The curved surfaces of the driving shoulders of the pockets 1 and 4 are of the same radius as the radius of the balls and the depths of the said pockets are equivalent to one-half the diameter of the balls. The depth of the reverse pockets 2 of the clutch member A is a little greater than the diameter of the balls so as to provide room for the balls on the reverse motion of the clutch member A to pass clear of the points of the inclined faces 5 of the clutch member H. When the clutch member A is rotated in the direction of the arrow shown in Fig. 1, a ball in the position of C' will be carried outwardly along the face 12, against the inclined face 5 of the clutch member H and up into the pocket 4. By the time the said ball has reached the pocket 4, the locking shoulder 3 will have passed under the ball, securing it in pocket 4, and the pocket 1 will then engage the said ball in driving position.

A ball in the position as at E' will remain stationary until the pocket 1 engages it against the pocket 4.

When the clutch is rotated in the direction for idling as shown in Fig. 2, the ball D will remain in the pocket 4 until the shoulder 3 has released it, and the surface 12 has revolved far enough past the ball to permit it to drop into the pocket 2. The ball C will be held against the inclined face 5 until pushed into the adjacent pocket 2, whereupon the said ball will clear the point of the face 5. The ball E will be pushed up the inclined face 5 into the adjacent pocket 2 and thus clear the point of 5.

The clutch member H is bored to fit closely to the shaft 10. When the balls are in driving position, they exert a radial force against the clutch member H, and being equally spaced, the outward pressure is divided all around and eliminates any twisting strain of the clutch member H on the shaft 10.

The bearing which the clutch member H has on the shaft helps to steady the male clutch member and pinion A and B on the said shaft, the said parts becoming virtually a unit when locked in driving position.

In a clutch of the character described, it is desirable to have so far as possible all the balls in locking engagement. This is not difficult except when the pocket 4 at the top of the driven member is substantially in line with the vertical. As the ball is being lifted into driving position by the rotation of the inclined surface 12 it is held against face 5 of the driven member. Before the surface 12 reaches the horizontal the locking shoulders pass under the ball and prevent it from rolling on the surface 12 into pocket 2 but carries it up so that the pawl will be in driving engagement with the pockets 1 and 4.

I claim:

1. In a clutch, a driving part and a driven part, the driving part being provided with driving pockets, the driven part being provided with cooperating pockets, balls adapted to fit in the said pockets, means for causing all the balls to be in locking engagement with the driven part in driving the load and comprising surfaces extending from the driving pockets to cause the said balls to move outwardly into driving position in the said driving pockets and shoulders between the driving pockets and the said surfaces for holding the balls in the said driving pockets.

2. In a clutch, the combination of a shaft, one part of the clutch being keyed to the shaft and driven and being provided with a chamber concentric with the shaft, the other part of the clutch rotating on the shaft and comprising a pinion and a clutch member made in one piece, the clutch member fitting into the said chamber and having pockets on its circumferential surface, and comprising driving pockets and reverse pockets, cooperating pockets on the driven part and balls adapted to fit in the said pockets, means for causing all the balls to be in locking engagement with the driven part in driving the load and comprising surfaces interposed between the driving and reverse pockets, shoulders adjacent the driving pockets for holding the balls therein, said clutch member and pinion having a bearing surface on the said shaft the entire length of the combined pinion and clutch member and directly under the line of thrust when the balls are engaged.

3. In a ball clutch, a driving part and a driven part, the driving part being provided with a plurality of pockets, comprising driving pockets and reverse pockets, cooperating pockets on the driven part, balls adapted to fit in the said pockets, means for causing all the balls to be in locking engagement with the driven part in driving the load and comprising a surface interposed between each driving pocket and reverse pocket respectively and a shoulder between each driving pocket and said surface for holding the balls in the said driving pockets.

4. In a ball clutch, a driving part and a driven part, the driving part being provided with a plurality of spaced radial driving pockets, the said driving part also being provided with a plurality of spaced radial reverse pockets, cooperating pockets on the driven part, balls adapted to engage the said pockets on the driving and driven parts, means for causing all the balls to be in locking engagement with the driven part in driving the load and comprising a surface interposed between each driving and reverse pocket respectively and shoulders between the driving pockets and the said surfaces for holding the balls in the said driving pockets.

FRANK T. FARMER.